(12) United States Patent
Takei

(10) Patent No.: US 12,301,780 B2
(45) Date of Patent: May 13, 2025

(54) INFORMATION PROCESSING APPARATUS

(71) Applicant: SONY GROUP CORPORATION, Tokyo (JP)

(72) Inventor: Shintaro Takei, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 124 days.

(21) Appl. No.: 18/006,003

(22) PCT Filed: Jul. 14, 2021

(86) PCT No.: PCT/JP2021/026479
§ 371 (c)(1),
(2) Date: Jan. 19, 2023

(87) PCT Pub. No.: WO2022/024764
PCT Pub. Date: Feb. 3, 2022

(65) Prior Publication Data
US 2023/0291889 A1   Sep. 14, 2023

(30) Foreign Application Priority Data

Jul. 28, 2020 (JP) .................... 2020-127276

(51) Int. Cl.
*G06T 15/00* (2011.01)
*G02B 27/01* (2006.01)
(Continued)

(52) U.S. Cl.
CPC ....... *H04N 13/327* (2018.05); *G02B 27/0172* (2013.01); *H04N 13/111* (2018.05);
(Continued)

(58) Field of Classification Search
CPC ...... H04N 13/398; H04N 13/332; H04N 5/64; H04N 13/111; H04N 13/366;
(Continued)

(56) References Cited

U.S. PATENT DOCUMENTS 11,801,114 B2 * 10/2023 Lang ................ A61B 90/98
2017/0307896 A1 * 10/2017 Kovaluk ............. G06T 19/006
(Continued)

FOREIGN PATENT DOCUMENTS

JP   2016-149660 A   8/2016
JP   2016-213663 A   12/2016
(Continued)

OTHER PUBLICATIONS

Tuceryan M, Genc Y, Navab N. Single-point active alignment method (SPAAM) for optical see-through HMD calibration for augmented reality. Presence: Teleoperators & Virtual Environments. Jun. 1, 2002;11(3):259-76.*

(Continued)

*Primary Examiner* — Phu K Nguyen
(74) *Attorney, Agent, or Firm* — CHIP LAW GROUP

(57) ABSTRACT

The present disclosure relates to an information processing apparatus capable of exhibiting appropriate performance with a simpler configuration. Provided is an information processing apparatus including: a projection unit that projects visible light onto a surface in a real space; a sensor that detects a position of the visible light projected onto the surface in the real space; a display unit having optical transparency; and a control unit that controls the projection unit, the sensor, and the display unit, in which relative positions of the projection unit, the sensor, and the display unit are fixed, and the control unit displays a target image for correcting a deviation from the position of the visible light on the display unit. The present disclosure can be applied to, for example, an HMD.

10 Claims, 7 Drawing Sheets

(51) Int. Cl.
*H04N 13/111* (2018.01)
*H04N 13/327* (2018.01)
*H04N 13/332* (2018.01)
*H04N 13/363* (2018.01)
*H04N 13/366* (2018.01)
*H04N 13/398* (2018.01)

(52) U.S. Cl.
CPC ......... *H04N 13/332* (2018.05); *H04N 13/363* (2018.05); *H04N 13/366* (2018.05); *H04N 13/398* (2018.05); *G02B 2027/014* (2013.01)

(58) Field of Classification Search
CPC ...... H04N 13/363; H04N 13/327; G09G 5/38; G09G 5/00; G02B 27/02; G02B 2027/014; G02B 27/0172
USPC .......................................................... 345/418
See application file for complete search history.

(56) References Cited

U.S. PATENT DOCUMENTS

| 2021/0080763 | A1* | 3/2021 | Sulai   | G02B 3/08  |
| 2024/0046490 | A1* | 2/2024 | Lang    | A61C 5/40  |
| 2024/0073219 | A1* | 2/2024 | Maizels | G10L 15/16 |

FOREIGN PATENT DOCUMENTS

| JP | 2018-026120 A | 2/2018 |
| JP | 2018-060011 A | 4/2018 |
| WO | 2013/179427 A1 | 12/2013 |

OTHER PUBLICATIONS

Wientapper F, Wuest H, Rojtberg P. Fellner D. A camera-based calibration for automotive augmented reality head-up-displays. In2013 IEEE International Symposium on Mixed and Augmented Reality (ISMAR) Oct. 1, 2013 (pp. 189-197). IEEE.*

Hua H, Gao C, Ahuja N. Calibration of an HMPD-based augmented reality system. IEEE Transactions on Systems, Man, and Cybernetics-Part A: Systems and Humans. Apr. 16, 2007;37(3):416-30.*

Fuhrmann A, Schmalstieg D, Purgathofer W. Practical calibration procedures for augmented reality. InVirtual Environments 2000: Proceedings of the Eurographics Workshop in Amsterdam, The Netherlands, Jun. 1-2, 2000 2000 (pp. 3-12). Springer Vienna.*

International Search Report and Written Opinion of PCT Application No. PCT/JP2021/026479, issued on Oct. 5, 2021, 09 pages of ISRWO.

* cited by examiner

INFORMATION PROCESSING APPARATUS

CROSS REFERENCE TO RELATED APPLICATIONS

This application is a U.S. National Phase of International Patent Application No. PCT/JP2021/026479 filed on Jul. 14, 2021, which claims priority benefit of Japanese Patent Application No. JP 2020-127276 filed in the Japan Patent Office on Jul. 28, 2020. Each of the above-referenced applications is hereby incorporated herein by reference in its entirety.

TECHNICAL FIELD

The present disclosure relates to an information processing apparatus, and more particularly, to an information processing apparatus that exhibits appropriate performance with a simple configuration.

BACKGROUND ART

In recent years, research and development for providing a new experience by fusing a real world such as augmented reality (AR) and a virtual world have been actively conducted. As an AR device capable of providing a user experience by AR, a head mounted display (HMD) can be used.

When the user wears the HMD, the HMD is worn in a state deviated from an ideal state in some cases. Technologies for detecting this type of deviation include, for example, techniques disclosed in Patent Documents 1 and 2.

Patent Document 1 discloses a technique of detecting a deviation amount in a case where a deviation occurs in a positional relationship between an HMD and an eye of a user by focusing on the positional relationship between the HMD and the eye and irradiating the eye with invisible light to grasp a pupil position. Patent Document 2 discloses a technique of acquiring an eyeball center position with an apparatus that acquires an optical axis vector corresponding to a line-of-sight of a user, and acquiring a relative positional deviation variation of a wearing device of an HMD on the basis of a time-series variation of the position.

CITATION LIST

Patent Documents

Patent Document 1: Japanese Patent Application Laid-Open No. 2018-026120
Patent Document 2: Japanese Patent Application Laid-Open No. 2016-149660

SUMMARY OF THE INVENTION

Problems to be Solved by the Invention

The techniques disclosed in Patent Documents 1 and 2 require a dedicated camera for imaging the user's eyeball in order to detect a wearing state deviated from an ideal wearing state.

The present disclosure provides an information processing apparatus capable of exhibiting appropriate performance with a simpler configuration.

Solutions to Problems

An information processing apparatus according to one aspect of the present disclosure is an information processing apparatus including: a projection unit that projects visible light onto a surface in a real space; a sensor that detects a position of the visible light projected onto the surface of the real space; a display unit having optical transparency; and a control unit that controls the projection unit, the sensor, and the display unit, in which relative positions of the projection unit, the sensor, and the display unit are fixed, and the control unit displays a target image for correcting a deviation from the position of the visible light on the display unit.

In an information processing apparatus according to one aspect of the present disclosure, relative positions of a projection unit that projects visible light onto a surface in a real space, a sensor that detects a position of the visible light projected onto the surface in the real space, and a display unit having optical transparency are fixed, and a control unit displays a target image for correcting a deviation from the position of the visible light on the display unit.

An information processing apparatus according to one aspect of the present disclosure may be an independent apparatus or an internal block constituting one apparatus.

MODE FOR CARRYING OUT THE INVENTION

1. Embodiments of the Present Technology

In an optical see-through type head mounted display (HMD) used for augmented reality (AR), a real space is recognized by a camera whose position has been adjusted in advance, and a virtual object such as an image or the like is displayed on a display having optical transparency, so that the virtual object is adjusted to be superimposed on the real space. As long as his/her eyes are located within a range called an eye box, a user (wearer) wearing the HMD can view the virtual object displayed on the display with the object being superimposed on the real space.

Figure 1:
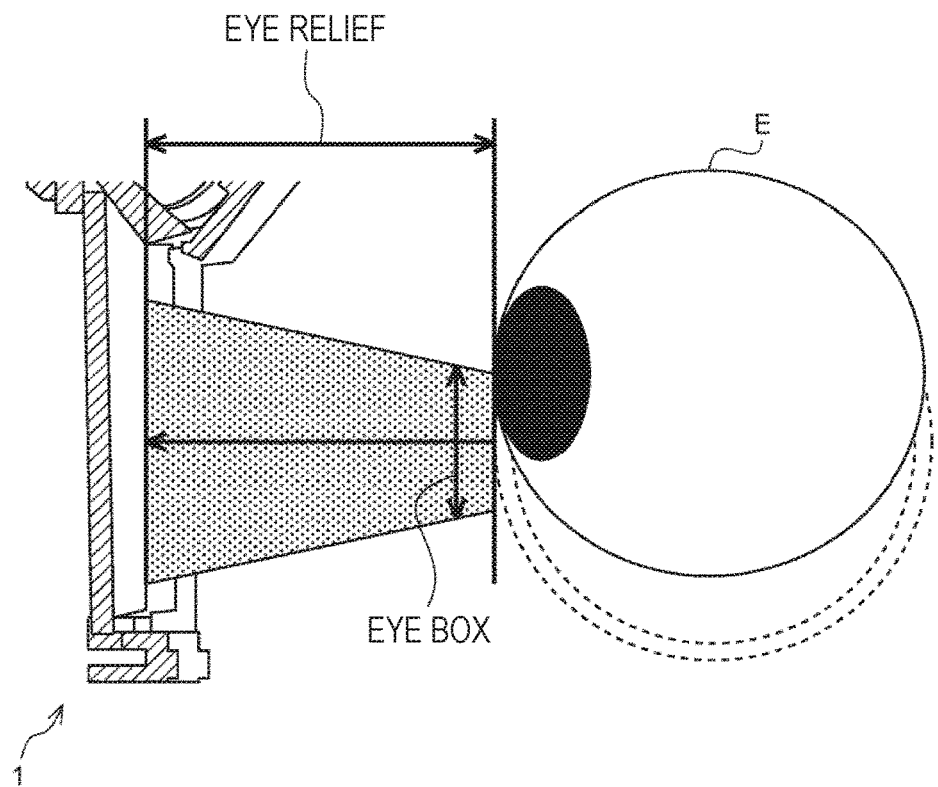
FIG. 1 is a diagram illustrating an outline of an eye box.

FIG. 1 is a diagram illustrating an outline of the eye box. FIG. 1 illustrates a cross section of a display having optical transparency and an optical system in an optical see-through HMD1 used for AR. A distance to the user's eye E is called eye relief. If the user's eye E is located in the range called the eye box, the virtual object can be viewed. The eye box is provided within a predetermined range (for example, a range of several mm in both directions) in the vertical direction and the horizontal direction in order to allow a personal difference in eye width and to suppress the image from being partially seen (to make it difficult to miss a part of the image) when the HMD is worn.

Originally, the state in which the virtual object is superimposed on the desired position in the real space without deviation can be viewed only in a case where the eye E of the user is at the eye position (ideal position) set within the range of the eye box at the time of calibration. Therefore, a state in which the user's eye and the ideal position of the eye set by the calibration are deviated (hereinafter, this state may be referred to as a "wearing-deviated state") may cause performance degradation of the AR function. The performance degradation of the AR function includes a deviation of the virtual object superimposed on a figure in the real space (real figure) and a deviation of the hand interaction to the virtual object based on the image acquired by the camera of the HMD. The performance degradation of the AR function may be considered to be caused by a deviation of a sensor capable of measuring three-dimensional information, the sensor being fixed to the display of the HMD.

Even in a case where the user's eye is not at the ideal position, if the user's eye is within the range of the eye box, the virtual object superimposed on the real space is visible, and thus, it is difficult for the user to grasp the wearing-deviated state. Therefore, the technology according to the present disclosure (the present technology) provides a simple information processing apparatus capable of causing the user wearing the HMD to recognize the wearing-deviated state and urging the user to correct the wearing deviation. Hereinafter, embodiments of the present technology will be described with reference to the drawings.

(Configuration of HMD)

Figure 2:
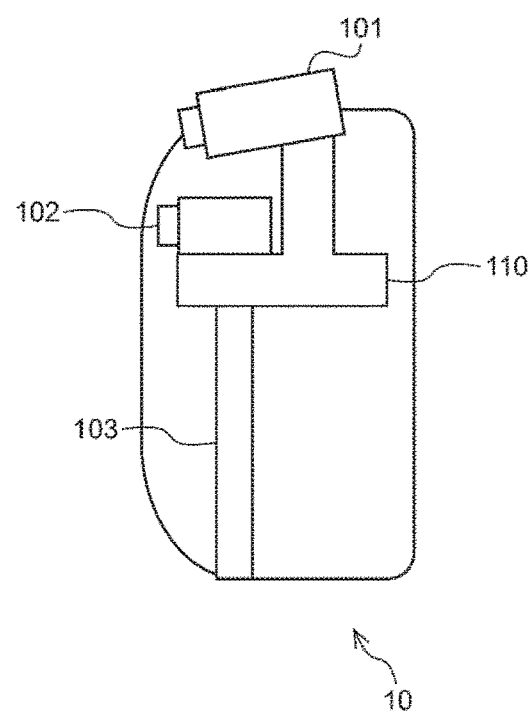
FIG. 2 is a diagram illustrating a configuration example of an embodiment of an HMD to which the technology according to the present disclosure is applied.

FIG. 2 is a diagram illustrating a configuration example of an embodiment of an HMD to which the technology according to the present disclosure is applied. FIG. 2 illustrates a side view of an HMD 10, but also illustrates a configuration in a housing of the HMD for convenience of description.

The HMD 10 is an optical see-through HMD (AR HMD) used for AR. The HMD 10 can execute an application using the AR technology, and can provide a user experience in which the real world and the virtual world are fused by being worn on the head of the user.

In the HMD 10, a visible light projection unit 101, an AR device unit 102, and a display unit 103 are configured as an integrated block by being fixed to a frame 110 provided in a housing in a calibrated state. The frame 110 is a member including metal or the like having a predetermined shape, and relative positions of the visible light projection unit 101, the AR device unit 102, and the display unit 103 are fixed by fixing each unit with a member for joining or bonding such as a screw, an adhesive, or the like.

The visible light projection unit 101 is an optical device including a laser light source that emits laser light as visible light and an optical system such as a lens or the like. In a case where the position of the visible light projected on a surface in a real space such as an opposed wall surface is at a predetermined distance (for example, a distance d in FIG. 4 as described later) from the surface in the real space at the time of calibration, the angle of the visible light projection unit 101 is physically adjusted so as to coincide with the center of the angle of view of the camera of the AR device unit 102 and is fixed to the frame 110 (the display unit 103). The visible light projection unit 101 irradiates a surface in the real space such as an opposed wall surface with visible light.

The AR device unit 102 includes a stereoscopic or monocular outward camera, a sensor capable of measuring three-dimensional information such as a time of flight (ToF) camera, and the like, and realizes a function related to AR. The AR device unit 102 acquires information regarding a physical object by detecting a position, a shape, a distance, and the like of the physical object in the real space on the basis of sensor signals detected by various sensors. Therefore, in the HMD 10, the real space is grasped, and a virtual object such as an image can be superimposed on a figure in the real space.

The AR device unit 102 detects a position of the visible light that has been projected on the surface in the real space by the visible light projection unit 101. Furthermore, the AR device unit 102 measures a distance to the surface in the real space on which the visible light has been projected by the visible light projection unit 101.

The display unit 103 is a display having optical transparency. As the display having optical transparency, an optical see-through display type display such as a semitransparent mirror type display, a hologram type display, a prism type display, or a retina scanning type display can be used.

The display unit 103 displays a virtual object such as an image or the like to be superimposed on a figure in the real space. Furthermore, the display unit 103 displays a target image. The target image is an image for correcting a deviation from a position of visible light projected on a surface in the real space such as a wall surface. The target image has a predetermined shape such as a gridded shape for alignment.

Figure 3:
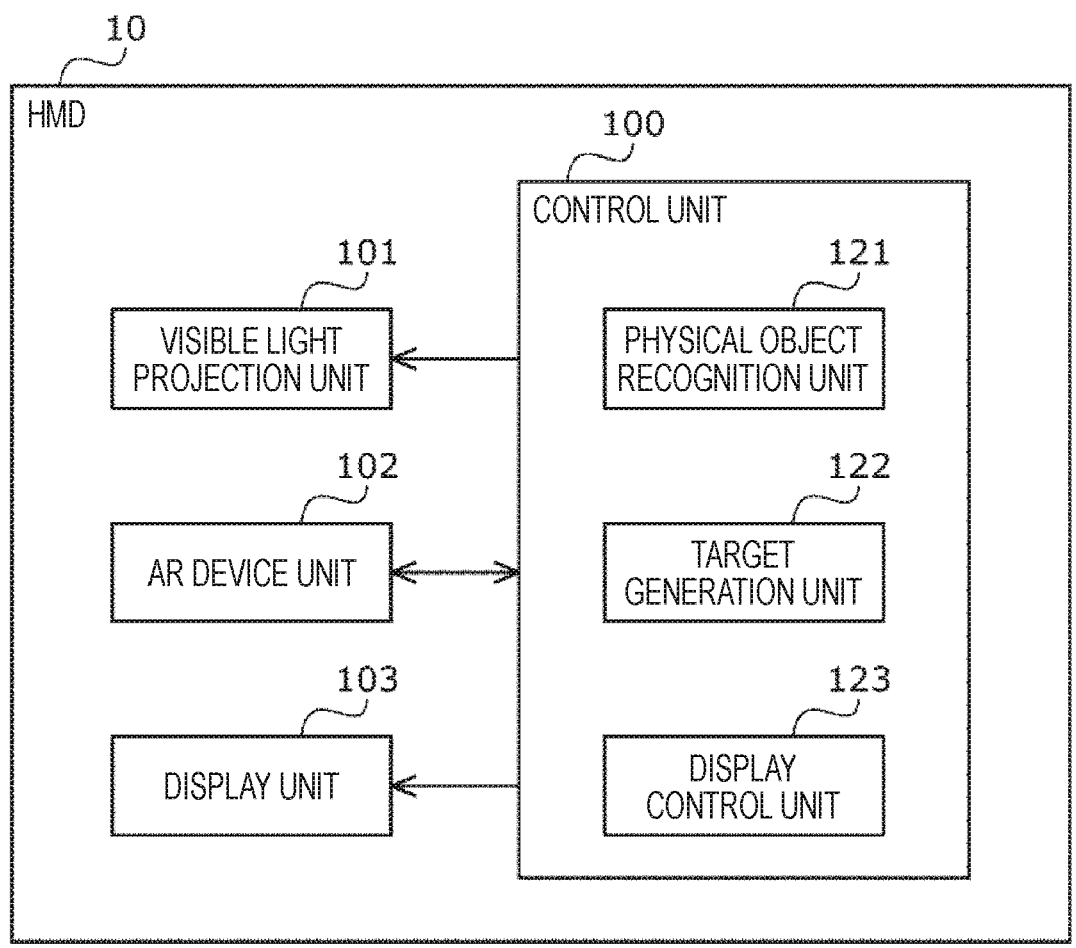
FIG. 3 is a block diagram illustrating a functional configuration example of an HMD to which the technology according to the present disclosure is applied.

FIG. 3 is a block diagram illustrating a functional configuration example of an HMD to which the technology according to the present disclosure is applied.

In FIG. 3, the HMD 10 includes a control unit 100 that controls the visible light projection unit 101, the AR device unit 102, and the display unit 103. The control unit 100 may be realized by software, or may be realized by hardware such as a central processing unit (CPU), a processor, or the like. The control unit 100 includes a physical object recognition unit 121, a target generation unit 122, and a display control unit 123.

The physical object recognition unit 121 performs recognition processing for recognizing a physical object in the real space and grasping the space on the basis of information such as position information and distance information supplied from the AR device unit 102. In this recognition processing, processing of recognizing the position of the HMD 10 (self-position) and the like are also performed in addition to recognizing various physical objects.

The target generation unit 122 performs generation processing for generating a target image. In this generation processing, it is possible to generate the target image according to the distance to the surface in the real space by using the distance information (information regarding the depth) from the self-position to the surface in the real space such as the wall surface or the like.

The display control unit 123 performs control to generate a virtual object on the basis of the result of the recognition processing performed by the physical object recognition unit 121 and to display the virtual object on the display unit 103. Performed in this display control is general control for controlling the display of the AR object, in which the position, posture, or state of the virtual object are controlled and localized in the real space. The virtual object is an object to be displayed by an AR device such as the HMD 10 or the like, and includes information such as text information in addition to an image.

The display control unit 123 performs control to display the target image generated by the target generation unit 122 on the display unit 103. The target image is an image for correcting a deviation from the position of the visible light projected on the surface in the real space, and the user can adjust the position of the visible light to an optimum position via the display unit 103 (display having optical transparency) displaying the target image.

The HMD 10 has the above-described configuration, and can draw a virtual object in the field of view using the AR technology without separating the field of view of the user from the real space by being worn around the eye of the user. Furthermore, the HMD 10 can cause the user to recognize the wearing-deviated state by the deviation between a projection position of the visible light and a display position of the target image.

(Positional Relationship Between Target and Visible Light)

Figure 4:
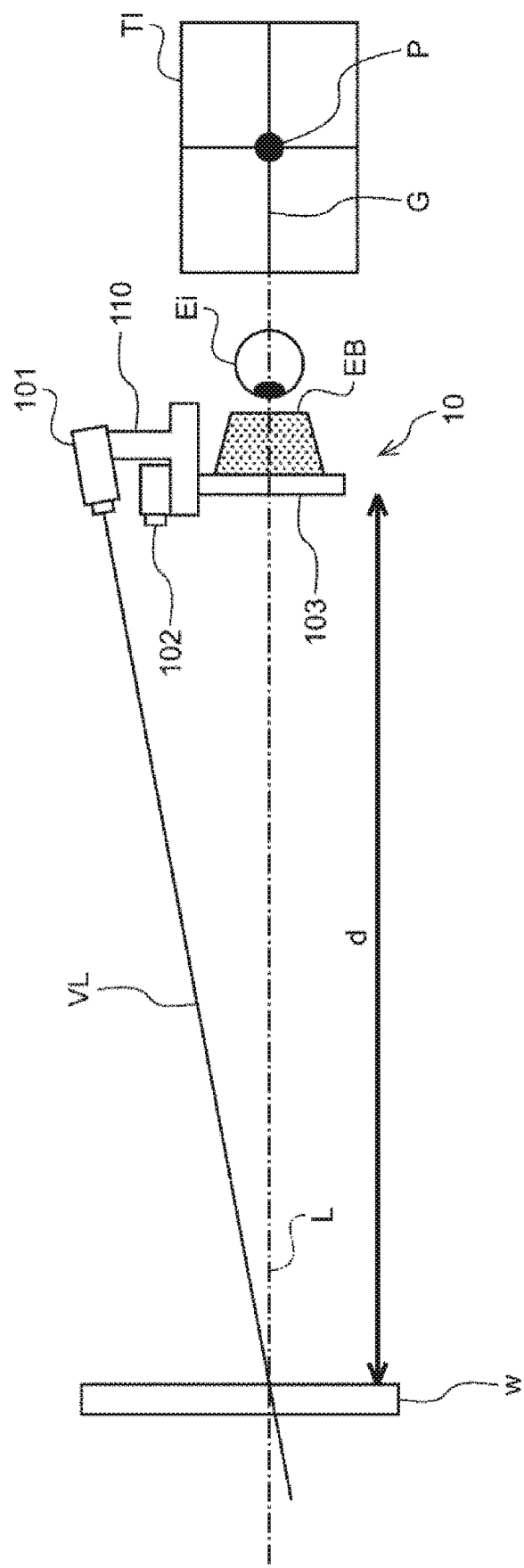
FIG. 4 is a diagram illustrating a first example of a positional relationship between a target and visible light.

FIG. 4 is a diagram illustrating a first example of a positional relationship between a target and visible light.

In FIG. 4, in a case where a wall w exists at a position separated by a distance d from the front surface of the HMD 10 worn by the user, visible light VL emitted by the visible light projection unit 101 is projected on the surface of the wall w. At this time, in the HMD 10, a target image TI is displayed on the display unit 103, and when viewed from the user, a grid G of the target image TI coincides with a point P of the visible light VL with which the surface of the wall w of the real space is irradiated.

The state illustrated in FIG. 4 is a state without wearing deviation. That is, in the HMD 10, for example, in a case where the distance d is 1 m, the angle of the visible light projection unit 101 is fixed such that the emitted visible light VL coincides with the center of the angle of view, and when the grid G of the target image TI and the point P of the visible light VL coincide with each other to bring a state without superimposition deviation, a state without wearing deviation is established. In other words, the point P of the visible light VL corresponds to the center of an eye box EB.

In FIG. 4, a line-of-sight L of the user indicated by the one-dot chain line intersects the visible light VL indicated by the solid line on the surface of the wall w, and the position of an eye Ei of the user is the ideal eye position (ideal position). In a case where the position of the eye Ei of the user is at the ideal position, the position coincides with the center of the eye box EB, and thus, in the HMD 10, when the virtual object is superimposed on the real space, the performance thereof can be appropriately exhibited.

Figure 5:
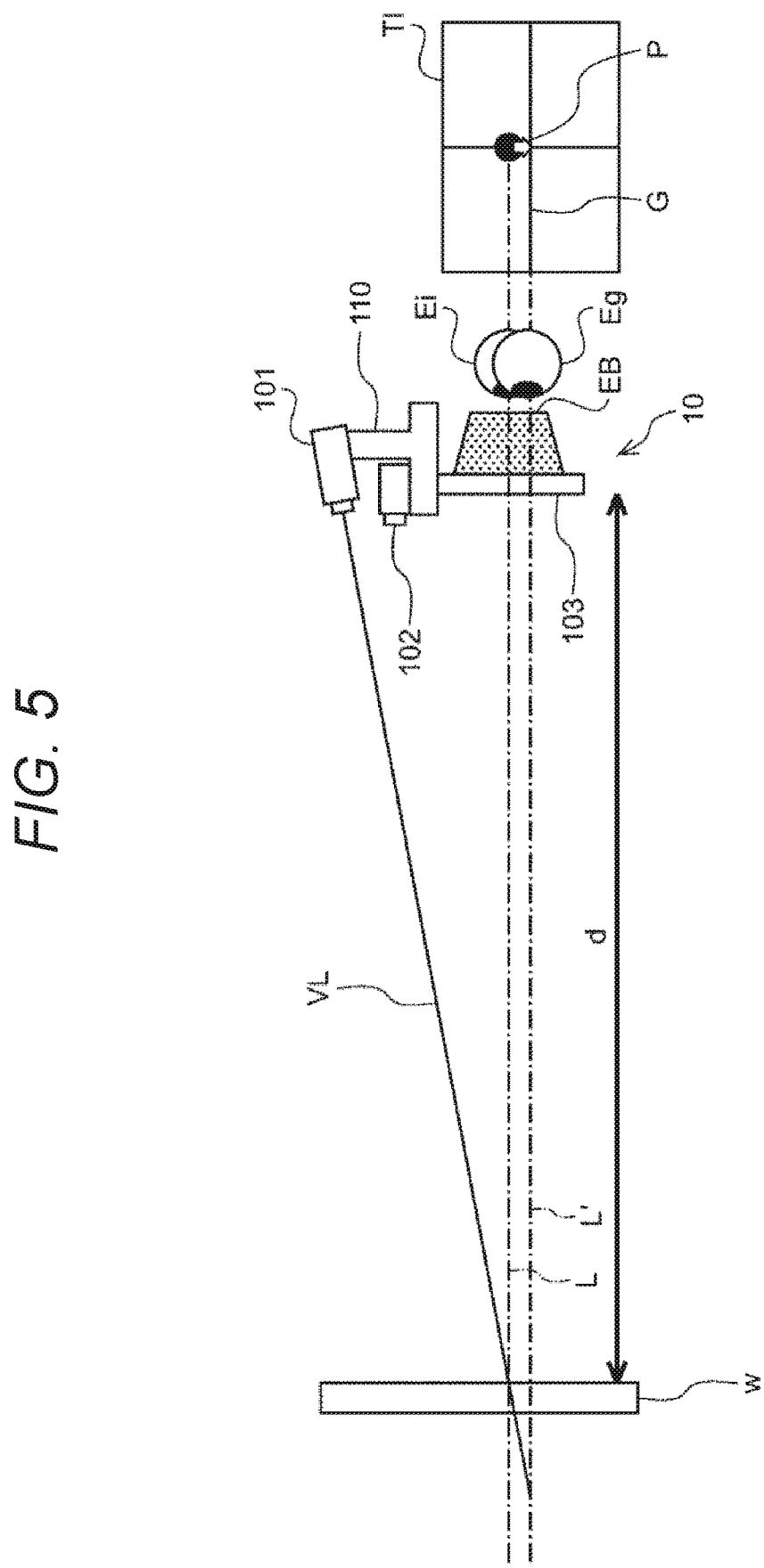
FIG. 5 is a diagram illustrating a second example of the positional relationship between the target and the visible light.

FIG. 5 is a diagram illustrating a second example of the positional relationship between the target and the visible light.

Similarly to FIG. 4, FIG. 5 illustrates a case where the visible light VL is projected onto the surface of the wall w separated by the distance d such as 1 m or the like. In FIG. 5, when viewed from the user wearing the HMD 10, the grid G of the target image TI does not coincide with the point P of the visible light VL emitted on the surface of the wall w of the real space.

In the state illustrated in FIG. 5, the HMD 10 worn by the user is deviated upward to bring a state where a wearing deviation is occurring. That is, in FIG. 5, a line-of-sight L' of the user represented by the one-dot chain line does not intersect with the visible light VL represented by the solid line on the surface of the wall w, and the position of an eye Eg of the user corresponds to the position of the eye in the wearing-deviated state. Note that, although FIG. 5 also illustrates an ideal eye Ei position (ideal position) for comparison, the actual position of an eye Eg of the user deviates downward from the ideal eye Ei position and is not at the ideal position.

In a case of the wearing-deviated state, the position of the eye Eg of the user does not coincide with the center of the eye box EB, but is within the range of the eye box EB, so that the user can see the virtual object superimposed on the real space. However, as described above, the HMD 10 cannot appropriately exhibit the performance of the AR function in a state where the wearing deviation is occurring, and the performance is deteriorated.

In a case where the wearing deviation occurs at the time of wearing or the like of the HMD 10, the grid G of the target image TI and the point P of the visible light VL do not coincide with each other, and thus, the user can intuitively recognize being in the wearing-deviated state. The user moves the HMD 10 he or she wears to coincide with the grid G of the target image TI displayed on the display unit 103 with the point P of the visible light VL projected on the surface of the wall w in the real space. Therefore, the position of the user's eye becomes the ideal position and coincides with the center of the eye box EB, and the HMD 10 can appropriately exhibit the performance of the AR function.

Figure 6:
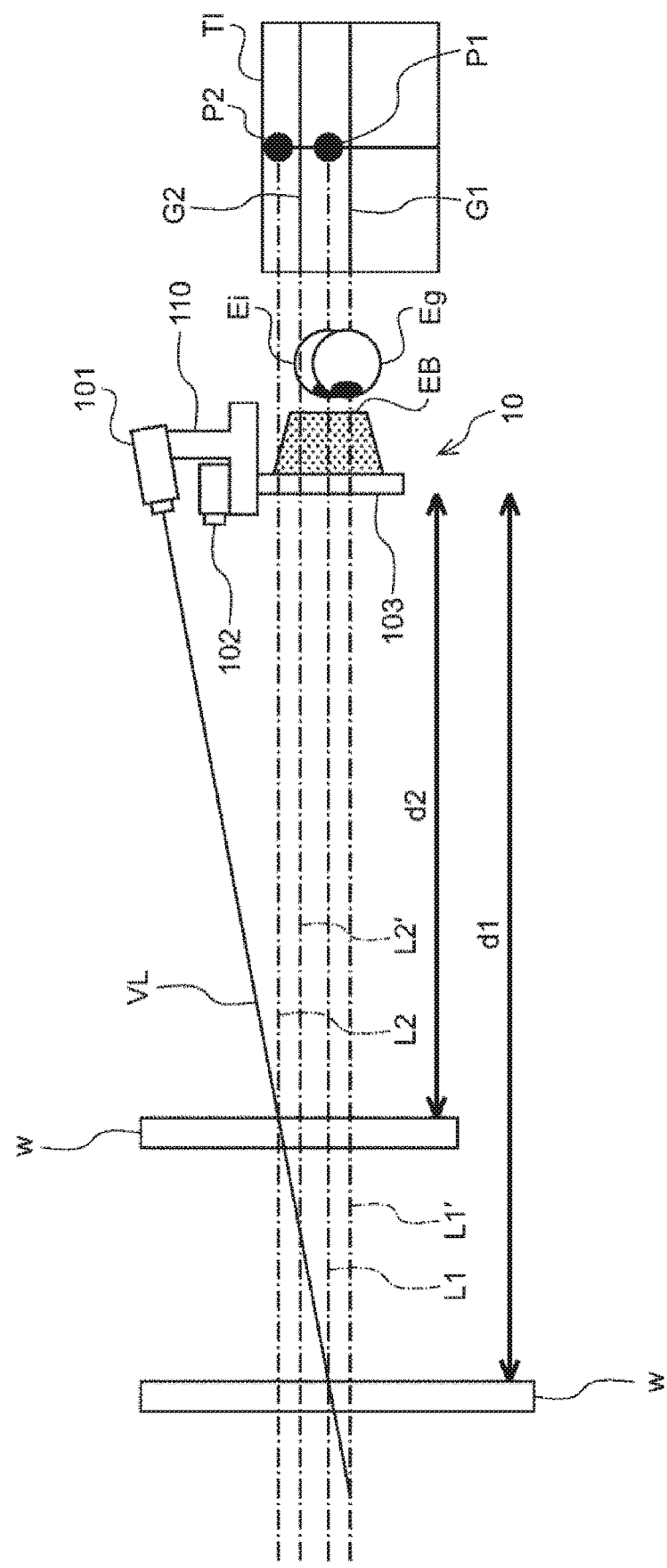
FIG. 6 is a diagram illustrating a third example of the positional relationship between the target and the visible light.

FIG. 6 is a diagram illustrating a third example of the positional relationship between the target and the visible light.

FIG. 6 illustrates a case where the distance d from the HMD 10 worn by the user to the wall w changes from d1 to d2. For example, the distance d2 is shorter than the distance d1, and is 0.8 m in a case where the distance d1 is 1 m.

In the HMD 10, in a case where the distance d is d1, a grid G1 of the target image TI does not coincide with a point P1 of the visible light VL emitted on the surface of the wall w, to bring a state where the wearing deviation is occurring. In FIG. 6, in a case where the distance d is d1, the line-of-sight L1' of the user represented by the one-dot chain line does not intersect with the visible light VL represented by the solid line on the surface of the wall w, and the position of the eye Eg of the user is deviated downward from the ideal eye Ei position. Note that, in FIG. 6, the ideal eye Ei position (ideal position) is illustrated for comparison, similarly to FIG. 5.

In a case where the distance d from the HMD 10 to the surface of the wall w changes from d1 to d2 due to the user's movement or the like, a grid G2 of the target image TI is displayed on the display unit 103. The grid G2 of the target image TI does not coincide with a point P2 of the visible light VL emitted on the surface of the wall w, to bring a state where the wearing deviation is occurring. In FIG. 6, in a case where the distance d is d2, a line-of-sight L2' of the user represented by the one-dot chain line does not intersect with the visible light VL represented by the solid line on the surface of the wall w, and the position of the eye of the user is deviated downward from the position of the ideal eye.

As described above, in the HMD 10, in a case where the distance d to the surface of the wall w changes from d1 to d2, the grid G of the target image TI displayed on the display unit 103 is updated from the grid G1 to the grid G2 on the basis of the information such as the distance information or the like measured by the AR device unit 102, and the change in the distance d is reflected. In other words, the point P of the visible light VL corresponds to the center of the eye box EB, and the grid G of the target image TI is adjusted using the distance information so as to correspond to the center of the eye box EB.

Therefore, even in a case where the distance d to the surface of the wall w changes, the user can intuitively recognize being in the wearing-deviated state from the positional relationship between the grid G2 of the target image TI and the point P2 of the visible light VL. The user moves the HMD 10 he or she wears to coincide with the grid G2 of the target image TI with the point P2 of the visible light VL, so that the position of the eye of the user becomes the ideal position. Therefore, the HMD 10 can appropriately exhibit the performance of the AR function.

Note that, in FIG. 6, both the grids G1 and G2 are illustrated as the grids G of the target image TI for convenience of description, but the grid G1 is displayed in a case where the distance d to the surface of the wall w is the distance d1, while the grid G2 is displayed in a case where the distance d is the distance d2, and one of the grids G is displayed according to the distance d. Similarly, although both the points P1 and P2 are illustrated as the points P of the visible light VL, one of the points P is projected on the surface of the wall w according to the distance d.

In the description of FIG. 6, the case where the distance d from the HMD 10 to the surface of the wall w becomes short (the case where the distance d1 changes to the distance d2) has been described, but similar things apply to the case where the distance d becomes long (the case where the distance d2 changes to the distance d1). Furthermore, in the description of FIG. 6, the walls w at the distance d1 and the distance d2 have been described as the same wall, but the walls are not limited to the same wall, and may be different walls.

(Flow of Processing)

Next, with reference to the flowchart of FIG. 7, a flow of the wearing deviation grasping function providing processing executed by the HMD 10 will be described. This providing processing is executed by transitioning to a predetermined mode at a predetermined timing such as when the HMD 10 is worn by the user.

In step S101, the control unit 100 determines whether or not a wall exists at a position opposed to the HMD 10 on the basis of a result of the recognition processing by the physical object recognition unit 121.

In a case where it is determined in the determination processing of step S101 that a wall exists, the user is in a state of being opposed to the wall, and thus the processing proceeds to step S102. In step S102, the AR device unit 102 measures a distance to a subject (a wall surface or the like) on which visible light emitted by the visible light projection unit 101 can be projected.

In step S103, the target generation unit 122 generates a target image according to the measured distance on the basis of the distance information acquired by the AR device unit 102. In step S104, the display control unit 123 displays the generated target image on the display unit 103.

In step S105, the visible light projection unit 101 irradiates the opposed wall surface with visible light. Therefore, the user wearing the HMD 10 can recognize whether or not (the grid of) the target image displayed on the display unit 103 coincides with (the point of) the visible light projected on the wall surface of the real space.

In step S106, the control unit 100 determines whether or not the user can align (the grid of) the target image and (the points of) the visible light by moving the HMD 10.

In a case where it is determined in the determination processing of step S106 that the alignment can be performed, the processing ends in a normal manner. In this case, when the user recognizes that the target image and the visible light do not coincide with each other, the user recognizes that the wearing deviation of the HMD 10 he or she wears is occurring, and moves the HMD 10 he or she wears to align (the grid of) the target image and (the point of) the visible light. Therefore, the wearing deviation of the HMD 10 is corrected, and in the HMD 10, processing for superimposing the virtual object on the real space is performed in a state where the performance can be appropriately exhibited.

On the other hand, in a case where it is determined that the alignment cannot be performed in the determination processing of step S106, the processing ends in an abnormal manner as a hardware problem of the HMD 10. In this case, the user may be notified of a message to that effect.

Note that, in a case where it is determined in the determination processing of step S101 that no wall exists, the processing proceeds to step S107. In step S107, the control unit 100 instructs the user to search for a wall. For example, as this instruction, a message is displayed on the display unit 103 or a message is output by voice. Thereafter, the processing returns to step S101, and the processing of steps S101 and S107 are repeated until it is determined in the determination processing of step S101 that a wall exists.

The flow of the wearing deviation grasping function providing processing has been described above. In this processing, the distance from the HMD 10 to the wall is measured by the AR device unit 102, the target image is generated by the control unit 100, and is displayed on the display unit 103 configured as a display having optical transparency at the time of activation of the wearing deviation grasping function. At the same time, in the HMD 10, the visible light emitted from the visible light projection unit 101 is projected on the wall surface. The user opposed to the wall can adjust the positional relationship between the HMD 10 and the pupil position to a state without wearing deviation by matching the wearing state of the HMD 10 such that the position of the visible light projected on the surface of the wall coincides with the position of the target image displayed on the display unit 103.

As for the distance to the wall irradiated with visible light, information regarding the depth (distance information) can be acquired using a stereo camera or the like included in a general AR HMD. Therefore, in the HMD 10, in an environment where the wall is located in front thereof, the control unit 100 such as a processor or the like generates and displays a target image according to the position of the wall, so that the user can grasp the wearing-deviated state and correct the state with the wearing deviation. That is, in the HMD 10, it is not necessary to additionally provide a dedicated camera, sensor, or the like in order to acquire information regarding the depth. Note that, in the providing processing illustrated in FIG. 7, in a case where the information regarding the depth is not used at the time of generating the target image, the processing of step S102 may be skipped.

2. Modification Examples

In the above description, the optical see-through HMD 10 used for AR has been described as an example of the information processing apparatus to which the technology according to the present disclosure is applied. However, the present disclosure is also applicable to another equipment as long as the equipment includes a display having optical transparency. That is, the technology according to the present disclosure is a technology for avoiding the wearing-deviated state unique to a display (deviation of the viewpoint of the user) that occurs due to largeness of an eye box in the display (optical see-through display) having optical transparency.

A part of the functions of the control unit 100 of the HMD 10 may be processed by another device. For example, the functions of the control unit 100 may be processed in a distributed manner using a server provided on a network such as the Internet or the like. Note that the optical see-through HMD 10 may employ a binocular method of observing a virtual object with both eyes of the user, or may employ a monocular method of observing a virtual object with only one eye of the user. Furthermore, in the above description, the case where the HMD 10 executes the application using the AR technology has been exemplified, but for example, various types of content using the AR technology and the like may be reproduced.

3. Configuration of Computer

The above-described series of processing (the providing processing illustrated in FIG. 7) may be executed by hardware or software. In a case where the series of processing is executed by software, a program constituting the software is installed in a computer of each device.

Figure 8:
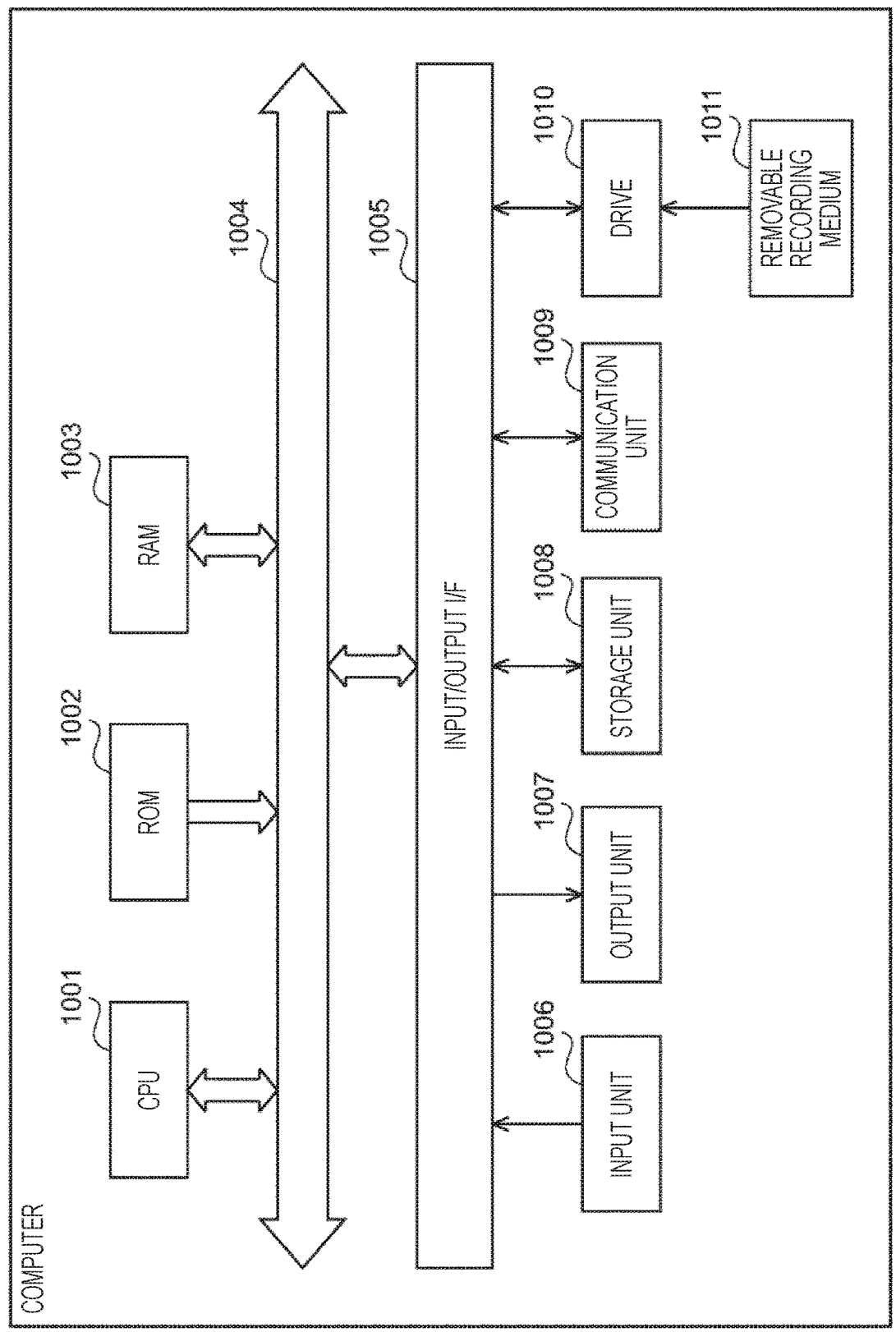
FIG. 8 is a block diagram illustrating a configuration example of a computer.

FIG. 8 is a block diagram illustrating a configuration example of hardware of a computer that executes the above-described series of processing by a program.

In the computer, a CPU 1001, a read only memory (ROM) 1002, and a random access memory (RAM) 1003 are mutually connected by a bus 1004. An input/output I/F 1005 is further connected to the bus 1004. An input unit 1006, an output unit 1007, a recording unit 1008, a communication unit 1009, and a drive 1010 are connected to the input/output I/F 1005.

The input unit 1006 includes a microphone, a keyboard, a mouse, and the like. The output unit 1007 includes a speaker, a display, and the like. The recording unit 1008 includes a hard disk, a nonvolatile memory, and the like. The communication unit 1009 includes a network interface and the like. The drive 1010 drives a removable recording medium 1011 such as a magnetic disk, an optical disk, a magneto-optical disk, or a semiconductor memory.

In the computer configured as described above, the CPU 1001 loads a program recorded in the ROM 1002 or the recording unit 1008 into the RAM 1003 via the input/output I/F 1005 and the bus 1004 and executes the program, whereby the above-described series of processing is performed.

The program executed by the computer (CPU 1001) can be provided by being recorded in the removable recording medium 1011 as a package medium or the like, for example. Furthermore, the program can be provided via a wired or wireless transmission medium such as a local area network, the Internet, or digital satellite broadcasting.

In the computer, the program can be installed in the recording unit 1008 via the input/output I/F 1005 by attaching the removable recording medium 1011 to the drive 1010. Furthermore, the program can be received by the communication unit 1009 via a wired or wireless transmission medium and installed in the recording unit 1008. In addition, the program can be installed in the ROM 1002 or the recording unit 1008 in advance.

Here, in the present specification, the processing performed by the computer in accordance with the program is not necessarily performed in time series in the order described as the flowchart. That is, the processing performed by the computer in accordance with the program also includes processing executed in parallel or individually (for example, parallel processing or processing by an object). Furthermore, the program may be processed by one computer (processor) or may be processed in a distributed manner by a plurality of computers.

Figure 7:
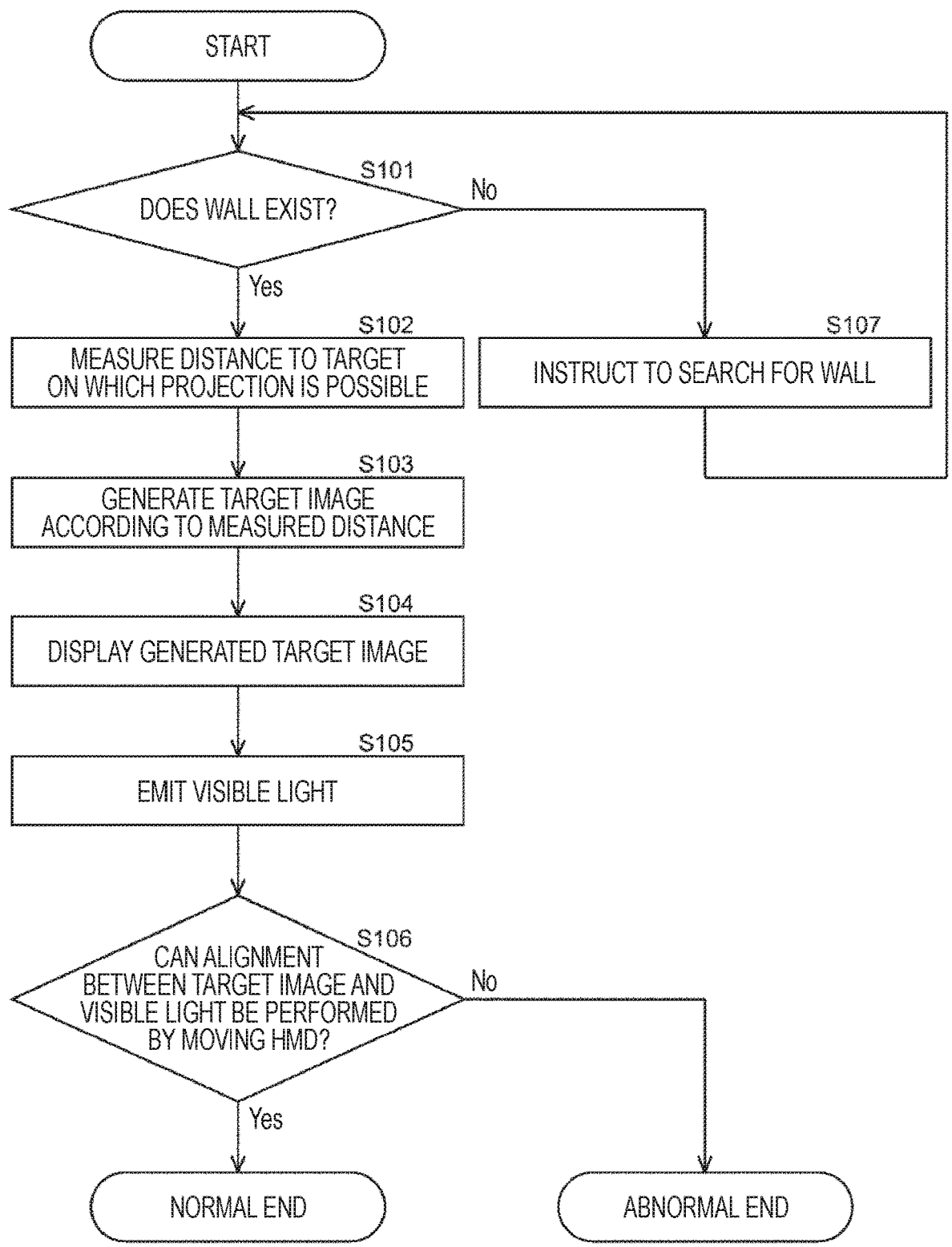
FIG. 7 is a flowchart for describing a flow of wearing deviation grasping function providing processing.

Furthermore, each step of the processing illustrated in FIG. 7 can be executed by one device or can be shared and executed by a plurality of devices. Furthermore, in a case where a plurality of pieces of processing is included in one step, the plurality of pieces of processing included in the one step can be executed by one device or can be shared and executed by a plurality of devices.

Note that the embodiments of the present technology are not limited to the above-described embodiments, and various modifications can be made in a range without departing from the gist of the present disclosure.

Furthermore, the effects described in the present specification are merely examples and are not limited, and other effects may be provided.

Note that the present disclosure can also have the following configurations.

(1)

An information processing apparatus including:
  a projection unit that projects visible light onto a surface in a real space;
  a sensor that detects a position of the visible light projected onto the surface in the real space;
  a display unit having optical transparency; and
  a control unit that controls the projection unit, the sensor, and the display unit, in which
  relative positions of the projection unit, the sensor, and the display unit are fixed, and
  the control unit displays a target image for correcting a deviation from the position of the visible light on the display unit.

(2)

The information processing apparatus described in (1) above, in which
  the sensor detects a depth of the surface in the real space, and
  the control unit adjusts a position of the target image on the basis of information regarding the depth detected.

(3)

The information processing apparatus described in (1) or (2) above, in which
  the projection unit is fixed to the display unit such that the position of the visible light corresponds to a center of an eye box of the display unit.

(4)

The information processing apparatus described in (3) above, in which
  the control unit adjusts a position of the target image on the basis of information regarding the depth detected so as to correspond to the center of the eye box of the display unit.

(5)

The information processing apparatus described in (3) or (4) above, in which
  an angle of the projection unit is fixed so as to correspond to a center of an angle of view in a case where the position of the visible light projected onto the surface in the real space is at a predetermined distance from the surface in the real space at the time of calibration.

(6)

The information processing apparatus described in (5), in which
  the sensor measures a distance to the surface in the real space, and
  the control unit displays the target image according to the measured distance on the display unit.

(7)

The information processing apparatus described in any one of (1) to (6) above, in which
the visible light is laser light, and
the target image has a gridded shape.

(8)

The information processing apparatus described in any one of (1) to (7) above, in which
the surface in the real space and the display unit exist in a direction of a line-of-sight of a user.

(9)

The information processing apparatus described in (8) above, in which
a positional relationship between the position of the visible light projected onto the surface in the real space and the target image displayed on the display unit are used to cause the user to recognize a deviation in a viewpoint.

(10)

The information processing apparatus described in any one of (1) to (9) above, configured as a head mounted display (HMD).

(11)

The information processing apparatus described in any one of (1) to (10) above, in which
the control unit displays information using an augmented reality (AR) technology on the display unit.

REFERENCE SIGNS LIST

10 HMD
100 Control unit
101 Visible light projection unit
102 AR device unit
103 Display unit
121 Physical object recognition unit
122 Target generation unit
123 Display control unit
1001 CPU

The invention claimed is:

1. An information processing apparatus, comprising:
a projection unit configured to project visible light onto a surface in a real space;
a sensor configured to detect a position of the projected visible light onto the surface in the real space;
a display unit having optical transparency; and
a control unit configured to:
control the projection unit, the sensor, and the display unit, wherein relative positions of the projection unit, the sensor, and the display unit are fixed;
generate a target image; and
control display of the target image on the display unit for detection of a deviation between the display unit and an eye of a user, wherein the deviation is based on a positional relation between the position of the projected visible light and a position of the target image displayed on the display unit.

2. The information processing apparatus according to claim 1, wherein
the sensor is further configured to detect a depth of the surface in the real space, and
the control unit is further configured to adjust the position of the target image based on the detected depth.

3. The information processing apparatus according to claim 1, wherein the position of the projected visible light corresponds to a center of an eye box of the display unit.

4. The information processing apparatus according to claim 3, wherein
the sensor is further configured to detect a depth of the surface in the real space, and
the control unit is further configured to adjust the position of the target image to the center of the eye box based on the detected depth.

5. The information processing apparatus according to claim 3, wherein
an angle of the projection unit corresponds to a center of an angle of view of the sensor, and
the position of the projected visible light is at a specific distance from the surface at a time of calibration.

6. The information processing apparatus according to claim 5, wherein
the sensor is further configured to measure a distance of the display unit to the surface, and
the control unit is further configured to display the target image based on measured distance.

7. The information processing apparatus according to claim 1, wherein the visible light is laser light and the target image has a gridded shape.

8. The information processing apparatus according to claim 1, wherein the surface and the display unit are in a direction of a line-of-sight of the user.

9. The information processing apparatus according to claim 8, wherein the information processing apparatus is a head mounted display (HMD).

10. The information processing apparatus according to claim 9, wherein the control unit is further configured to display information on the display unit based on an augmented reality (AR) technology.

* * * * *